United States Patent
Brown et al.

(10) Patent No.: US 11,381,591 B2
(45) Date of Patent: Jul. 5, 2022

(54) INFORMATION SECURITY SYSTEM BASED ON MULTIDIMENSIONAL DISPARATE USER DATA

(71) Applicant: Bank of America Corporation, Charlotte, NC (US)

(72) Inventors: Stephen C. Brown, Charlotte, NC (US); John Scott Alston, Pineville, NC (US); Olga Kocharyan, Matthewa, NC (US); George Albero, Charlotte, NC (US); Edward Lee Traywick, Charlotte, NC (US); Keaton Drake, Charlotte, NC (US); Cody Searl, Pineville, NC (US)

(73) Assignee: Bank of America Corporation, Charlotte, NC (US)

( * ) Notice: Subject to any disclaimer, the term of this patent is extended or adjusted under 35 U.S.C. 154(b) by 200 days.

(21) Appl. No.: 16/775,526

(22) Filed: Jan. 29, 2020

(65) Prior Publication Data
US 2021/0234884 A1 Jul. 29, 2021

(51) Int. Cl.
 G06F 11/00 (2006.01)
 G06F 12/14 (2006.01)
 G06F 12/16 (2006.01)
 H04L 9/40 (2022.01)
 H04L 41/22 (2022.01)
 H04L 67/1097 (2022.01)

(52) U.S. Cl.
 CPC ......... *H04L 63/1433* (2013.01); *H04L 41/22* (2013.01); *H04L 63/02* (2013.01); *H04L 63/102* (2013.01); *H04L 63/1416* (2013.01); *H04L 63/20* (2013.01); *H04L 67/1097* (2013.01)

(58) Field of Classification Search
 CPC . G06Q 10/10; H04L 63/1441; H04L 63/1433; H04L 63/1416; H04L 63/1425; G06F 21/56; G06F 21/577; G08B 23/00; G08B 25/006
 See application file for complete search history.

(56) References Cited

U.S. PATENT DOCUMENTS 8,041,592 B2  10/2011  Lopez
8,402,003 B2  3/2013   Biran et al.
(Continued)

*Primary Examiner* — Dustin Nguyen
(74) *Attorney, Agent, or Firm* — Banner & Witcoff, Ltd.

(57) ABSTRACT

Aspects of the disclosure relate to information security by identifying unique or related factors in common between individuals subject to a common threat vector. Data mining and data acquisition of public and non-public user information is performed to prevent, disrupt, and/or address criminal, cyber, and fraudulent threats. The information can be normalized into template(s) to align information across disparate datasets and enable efficient storage of the big data into appropriate fields to be tracked. The information can be stored in data warehouse(s) or in multidimensional data structure(s) for investigation if a threat vector against a group of individuals is detected. The multidimensional data can be analyzed to identify direct connections, common connecting entities, and/or connectivity clusters between individuals who were attacked or who may be attacked in the future. Remediation, machine learning, enhanced security, and/or vulnerability assessments may be implemented based on the results of the analysis.

20 Claims, 11 Drawing Sheets

Sample 5-D Hypercube Multidimensional Data Structure For A Data Warehouse
299

(56) References Cited

U.S. PATENT DOCUMENTS

| | | |
|---|---|---|
| 8,528,091 B2 | 9/2013 | Bowen et al. |
| 9,105,000 B1 | 8/2015 | White et al. |
| 9,118,714 B1* | 8/2015 | Thomson ............ H04L 63/1433 |
| 9,178,901 B2 | 11/2015 | Xue et al. |
| 9,338,181 B1* | 5/2016 | Burns ................ H04L 63/1416 |
| 9,367,872 B1 | 6/2016 | Visbal et al. |
| 9,548,988 B1 | 1/2017 | Roundy et al. |
| 9,674,221 B1 | 6/2017 | Higbee et al. |
| 9,760,838 B1 | 9/2017 | Danson et al. |
| 9,811,683 B2 | 11/2017 | Adams et al. |
| 9,838,407 B1 | 12/2017 | Oprea et al. |
| 10,187,407 B1 | 1/2019 | Higbee et al. |
| 10,356,032 B2 | 7/2019 | White |
| 10,425,444 B2 | 9/2019 | Elworthy |
| 2008/0086773 A1* | 4/2008 | Tuvell .................... G06F 21/56 726/23 |
| 2014/0229407 A1* | 8/2014 | White .................... G06Q 10/10 706/12 |
| 2014/0337973 A1* | 11/2014 | Foster ................ H04L 63/1441 726/22 |
| 2016/0164905 A1* | 6/2016 | Pinney Wood ....... G06F 21/577 |
| 2017/0346846 A1* | 11/2017 | Findlay ............... H04L 63/1433 |
| 2018/0191771 A1* | 7/2018 | Newman ............. H04L 63/1433 |
| 2018/0218157 A1* | 8/2018 | Price ................... H04L 63/1433 |
| 2019/0026461 A1 | 1/2019 | Cidon et al. |
| 2019/0096217 A1* | 3/2019 | Pourmohammad .... G08B 23/00 |
| 2019/0138512 A1* | 5/2019 | Pourmohammad .. G08B 25/006 |
| 2020/0259852 A1* | 8/2020 | Wolff .................. H04L 63/1441 |
| 2020/0304462 A1* | 9/2020 | Kopp .................. H04L 63/1425 |
| 2021/0168157 A1* | 6/2021 | Conner .................... G06F 21/56 |

\* cited by examiner

INFORMATION SECURITY SYSTEM BASED ON MULTIDIMENSIONAL DISPARATE USER DATA

TECHNICAL FIELD OF DISCLOSURE

Aspects of the disclosure relate to processes, machines, and platforms for information security and, in particular, to monitoring and scanning of software or data, based on common threat vectors targeting a group of individuals, for attack and intrusion detection, analysis of common threat vectors, data acquisition and normalization of disparate data, big data multidimensional data storage, remediation of attacks, machine learning from attacks, attack prevention, for vulnerability assessments, and/or prediction of future targets based on the analyzed common threat vectors.

BACKGROUND

Information security is the practice of protecting information by mitigating information risks. Prior art attempts at providing information security typically involve attempting to prevent or at least reduce the possibility of unauthorized/ inappropriate access, use, disclosure, disruption, deletion/ destruction, corruption, modification, inspection, recording or devaluation of information. The primary focus of information security is the protection of the confidentiality, integrity and availability of data while trying to avoid hampering organization productivity. Typically, this is largely achieved through a structured risk management process that involves: identifying information and related assets, potential threats, vulnerabilities and impacts; evaluating risks; deciding how to address or treat the risks to avoid, mitigate, share or accept them; and, where risk mitigation is required, selecting or designing appropriate security controls and implementing them; and monitoring the activities, making adjustments as necessary to address any issues, changes and improvement opportunities.

Such prior art attempts to provide information security are insufficient. Multiple individuals inside a large organization may have been targeted with the same or similar threat vector (i.e., paths or tools that a threat actor uses to attack one or more targets). "Threat vector(s)" include malware, computer viruses, worms, Trojan horses, ransomware, spyware, adware, scareware, phishing, fraud, and/or other potentially harmful schemes. As used herein, "common threat vector" refers to either the same or a similar threat vector being utilized by bad actors.

Persons of skill in the art will appreciate that it is important to investigate and understand how and why these threat vectors specifically targeted a particular group of individuals out of a virtually unlimited number of users, customers, or organization employees. The answers to questions like these are often unknown or impossible to determine based on existing technologies and disparate datasets from a virtually unlimited amount of big data. Without this information, it is extremely difficult, if not almost impossible, to understand past attacks, assess vulnerabilities, predict or prevent future attacks, attempt to mitigate against current and future risks, investigate the attackers, and/or make strategic improvements in order to better identify and disrupt criminal, cyber and fraudulent threats.

In the past, information security specialists have attempted to reconstruct historical information from scratch for each critical intrusion or attack using generic commercial software applications to perform manual mapping data in an effort to try to piece together whatever limited information was available. Such manual efforts inevitably fail to locate all applicable data and analyze it to establish the information connectivity between individuals who were attacked. Further, these manual efforts could take a team of specialists months if not years to even attempt to piece together even a small portion of the overall puzzle of connectivity, if it is even possible to do manually using commercially available software. These types of manual efforts to locate a needle in a proverbial haystack almost always fail to provide the connectivity information and clusters of data necessary to understand past attacks, assess vulnerabilities, predict or prevent future attacks, and mitigate against current and future risks.

This disclosure addresses one or more of the shortcomings in the industry to overcome the technical problems associated with identifying and utilizing information security and related connectivity data pertaining to common threat vectors against a targeted group of individuals, users, employees, and/or customers.

SUMMARY

Aspects of the disclosure provide effective, efficient, scalable, and convenient technical solutions that address and overcome the technical problems associated with information security by identifying unique or related factors common to individuals subject to the same or similar attacks from a common threat vector. Identification of these factors can be used to understand the nature of the attack, how it was designed, how users were targeted, and how it was implemented. This analysis can be used further to remediate the attacks, learn from past attacks, prevent future attacks, identify potential future targets, and/or perform vulnerability assessments, etc., in order to better identify and disrupt criminal, cyber and fraudulent threats. This can be accomplished in one or more embodiments by: data mining and data acquisition of as much public and non-public information as individuals are willing to share confidentially and/or that companies what to collect, to prevent criminal, cyber, and fraudulent threats; normalizing the information into dynamic template(s) to align information across disparate datasets and enable efficient storage of the big data into appropriate fields, cubes, cells, tables, or storage containers; storing such information in a data warehouse or other storage in a multidimensional data structure or database for later optimized investigation in the event that a threat vector against a plurality of individuals is detected; and analyzing the multidimensional data on demand, in real time, automatically in response to a trigger, or as part of a batch process to identify direct connections, common connecting entities, and/or connectivity clusters between individuals who were attacked or who may be attacked.

In some embodiments, an information security computing platform coupled to a network can perform connectivity analysis between a plurality of users targeted with a common threat vector. The information security platform can have access to at least one external legitimate data store, also coupled to a network, containing online user information (e.g., on social media, other marketing or business web sites, other online profiles, other online professional or personal memberships or accounts, or any other online source). The external legitimate data store is typically authorized by the users and typically resides on a public network and it outside a company's firewall.

The computing platform includes: at least one processor; at least one in-network data store containing internal company user information; at least one data warehouse having at least three-dimensional data storage coupled to the network; a communication interface communicatively coupled to the at least one processor and the network; at least one firewall included in the network that protects, inter alia, the at least one processor, the at least one in-network data store, and the at least one data warehouse; and at least one non-transitory computer-readable medium with computer-executable instructions stored thereon.

The computer-executable instructions, when executed by the at least one processor, cause the computing platform to: retrieve, via the communication interface, from the at least one in-network data store, internal company user information, and store the information in the at least one warehouse; retrieve, via the communication interface, from the at least one external legitimate data store containing the online user information (e.g., on social media, other marketing or business web sites, other online profiles, other online professional or personal memberships or accounts, or any other online source) and store the online user information in the at least one data warehouse. The computer-executable instructions also: receive, via the communication interface, from an enterprise user computing device or other authorized user or computing device, a list of targeted users who were attacked with the common threat vector. The instructions then cause the platform to: search, via the communication interface, the at least one data warehouse, for a subset of the internal user information and the online user information which correspond to the list of targeted users; retrieve, via the communication interface, from the at least one data warehouse, the subset of information corresponding to the list of targeted users; store, on the computer-readable medium, the subset corresponding to the list of targeted users; identify, by the at least one processor, similar data in the subset of the information in the at least one data warehouse that the targeted users have in common; store, on the non-transitory computer readable medium, the similar data; and transmit, via the communication interface, from the computing platform to the enterprise user computing device or other authorized user or device, the similar data, wherein transmitting the similar data to the user or device causes the computing device to display a visualization of results of the connectivity analysis.

In some embodiments, the data structure of the at least one data warehouse is at least one hypercube or other 4-dimensional, 5-dimensional, or larger "N"-dimensional database, data store, or other data structure suitable for efficient storage and fast searching of big data. A computing platform may include multidimensional database management software to manage the at least one data warehouse or multidimensional data structures.

In some embodiments, internal company information can include one or more of information from any company department, database, or internal records such as any referenced in FIG. 2A or other. By way of non-limiting examples, the information could be: human resources information, travel information, marketing information, accounting information; telephone information and call record information, emails or email information, geospatial information, and/or any other stored, tracked, or accessible company information for some or all of its users, employees, customers, or other individuals.

In some embodiments, the non-transitory computer-readable medium for an information security computing platform can have various modules or computer-executable instructions that cause the platform to: implement, by the at least one processor based on similar data in common between users targeted with the same or similar threat vector, enhanced security measures for some or all of the users; predict or identify other users who may be targeted with the same or similar threat vector; store the prediction or identification, and transmit it to an enterprise computing or other authorized device. The instructions may also cause the prediction or identification to be displayed on any such device.

In some embodiments, the information computing platform may include or utilize templates to help normalize internal or external data into a common or similar format or structure in the at least one data warehouse in order to facilitate efficient storage and fast searching. The templates may be static or dynamic. In the case of dynamic templates, machine learning can be used to identify additional types of data to be tracked or fields of data to be stored. Hence, the templates can evolve in order to include as much relevant or available information as desired in the at least one data warehouse. Other types of machine learning can be used to improve the processes and systems described herein.

In some embodiments, irrespective of whether templates are used, the information computing platform may include or utilize normalization or similar instructions to assist in ingestion of internal and external data into appropriate fields or storage in the multidimensional data structure(s) in the at least one data warehouse.

In some embodiments, the information computing platform may include computer-executable instructions to enable external illegitimate or unauthorized data sources (e.g., those on the Dark Web or other online source) to be searched, retrieved, and stored in the at least one data warehouse. Again, as part of a connectivity analysis, some or all of the internal, external legitimate, and external illegitimate information in the at least one data warehouse may be searched by the information computing platform.

In some embodiments, various computer-implemented methods for performing connectivity analysis can be used to identify connection information relating to a plurality of users targeted with a common threat vector. The method can include one or more steps such as, for example: storing, by a security computer machine (having typical computer components and functionality such as at least one processor, non-volatile memory, a communication interface, etc.), employee information and social media information (or other information retrieved from online legitimate or illegitimate sources) in at least one hypercube data warehouse coupled to a network; receiving, by the security computer machine from an enterprise computing device via the communication interface, a list of the users targeted with the common threat vector; storing, by the security computer machine in a first sector of the non-volatile memory, the list of the users targeted with the common threat vector; analyzing, by the security computer machine, the employee information and the social media information in the at least one hypercube data warehouse to identify similar data corresponding to the list of users targeted with the common threat vector; storing, by the security computer machine in a second sector of the non-volatile memory, the similar data corresponding to the list of users targeted with the common threat vector; and transmitting, by the security computer machine to the enterprise user computing device via the communication interface, the similar data corresponding to the list of users targeted with the common threat vector, wherein transmitting the similar data to the enterprise user computing device causes the enterprise user computing device to display a visualization of results of the connectivity analysis.

In some embodiments, one or more non-transitory computer-readable media with computer-executable instructions stored thereon executed by one or more processors on a computer machine, communicatively coupled to a network, can include: retrieval instructions to retrieve information (e.g., from internal, external legitimate, and/or external illegitimate sources) from at least one in-network data store; storage instructions to store the information in at least one hypercube data warehouse; input instructions to receive (or otherwise identify) a list of users targeted by the common threat vector; search instructions to search the hypercube or other data warehouse for similar data in common (either identical or similar) between the individuals (e.g., users, employees, customers, etc.) in the at least one hypercube data warehouse that were targeted by the common threat vector; and transmission instructions to transmit, the similar data in the at least one hypercube data warehouse corresponding to the list of users targeted by the common threat vector, to the enterprise computing device or other requesting person or device in order to cause visualization of results of the connectivity analysis to be output or displayed.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1A:
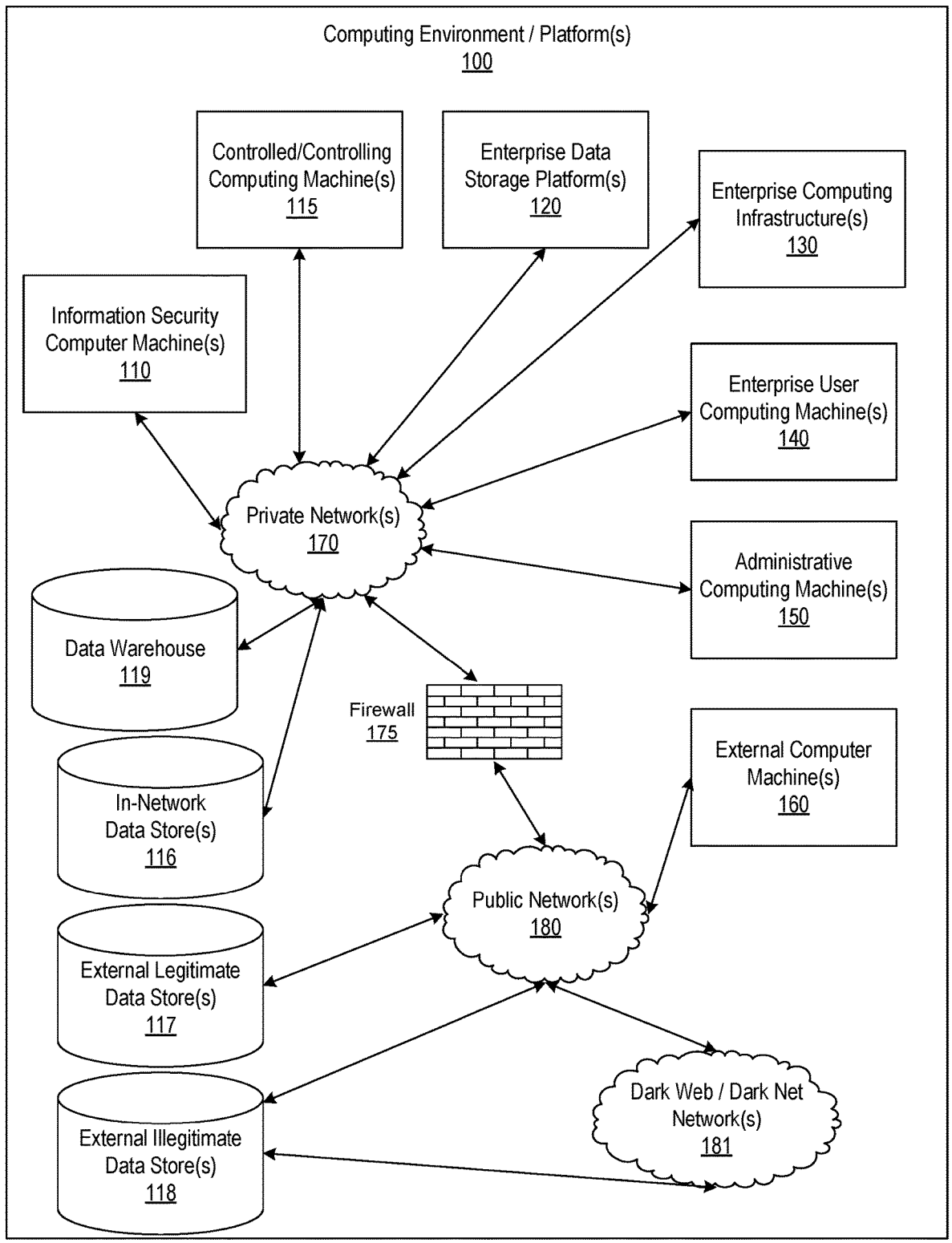
FIGS. 1A and 1B depict illustrative computing environment(s), information security computer machines, platform(s), and module(s), in accordance with one or more environments, for performing connectivity analysis between a plurality of users targeted with a common threat vector.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As used throughout this disclosure, computer-executable "software and data" can include one or more: algorithms, applications, application program interfaces (APIs), attachments, big data, daemons, emails, encryptions, databases and data structures (including cubes, hypercubes, data warehouses, multidimensional databases, multidimensional database management systems, multidimensional data structures, online analytical processing (OLAP) applications, cubes and data storage, relational databases, etc.), datasets, data sources, drivers, file systems or distributed file systems, firmware, graphical user interfaces, images, instructions, machine learning, middleware, modules, objects, operating systems, processes, protocols, programs, scripts, tools, and utilities. The computer-executable software and data is on tangible, computer-readable memory (local, in network-attached storage, remote, and/or online), can be stored in volatile or non-volatile memory, and can operate automatically and/or autonomously, based on even triggers, on-demand, on a schedule, and/or as part of batch processing. It can operate in real time or otherwise.

"Computer machines" and "information computer security machines and/or platforms" can include one or more: general-purpose or special-purpose network-accessible administrative computers, clusters, computing devices, computing platforms, desktop computers, distributed systems, enterprise computers, laptop or notebook computers, controlling computers, nodes, personal computers, portable electronic devices, servers, controlled computers, smart devices, tablets, and/or workstations, which have one or more microprocessors, cores, and/or executors such as for executing or accessing the computer-executable software and data. References to computer machines and names of devices included within this definition are used interchangeably in this specification and are not considered to be limiting or exclusive to only a specific type of device or type of user. Instead, references in this disclosure to computer machines, platforms, and the like are to be interpreted broadly as understood by skilled artisans. Further, as used in this specification, computer machines also include all hardware and components typically contained therein such as, for example, processors/executors/cores 111, volatile and non-volatile memories 112, modules in memory 112*a*-112*s*, communication interfaces 113, etc.

Volatile and non-volatile memories may be comprised of one or more computer-readable media containing a plurality of sectors. As used herein, a "sector" is broadly defined as subdivision(s) or block(s) of memory and is not limited to the minimum storage unit of a hard drive or other computer-readable medium. Further, the sector may have a fixed size or may be variable.

Computer "networks" can include one or more local area networks (LANs), wide area networks (WANs), the Internet and public networks 180, wireless networks, digital subscriber line (DSL) networks, frame relay networks, asynchronous transfer mode (ATM) networks, private networks 170, virtual private networks (VPN), the Deep Web/Dark Web networks 181, or any combination of any of the same. Networks also include associated "network equipment" such as access points, ethernet adaptors (physical and wireless), firewall(s) 117, hubs, modems, routers, security devices, and/or switches located inside the network and/or on its periphery, as well as software executing on any of the foregoing.

Figure 1B:
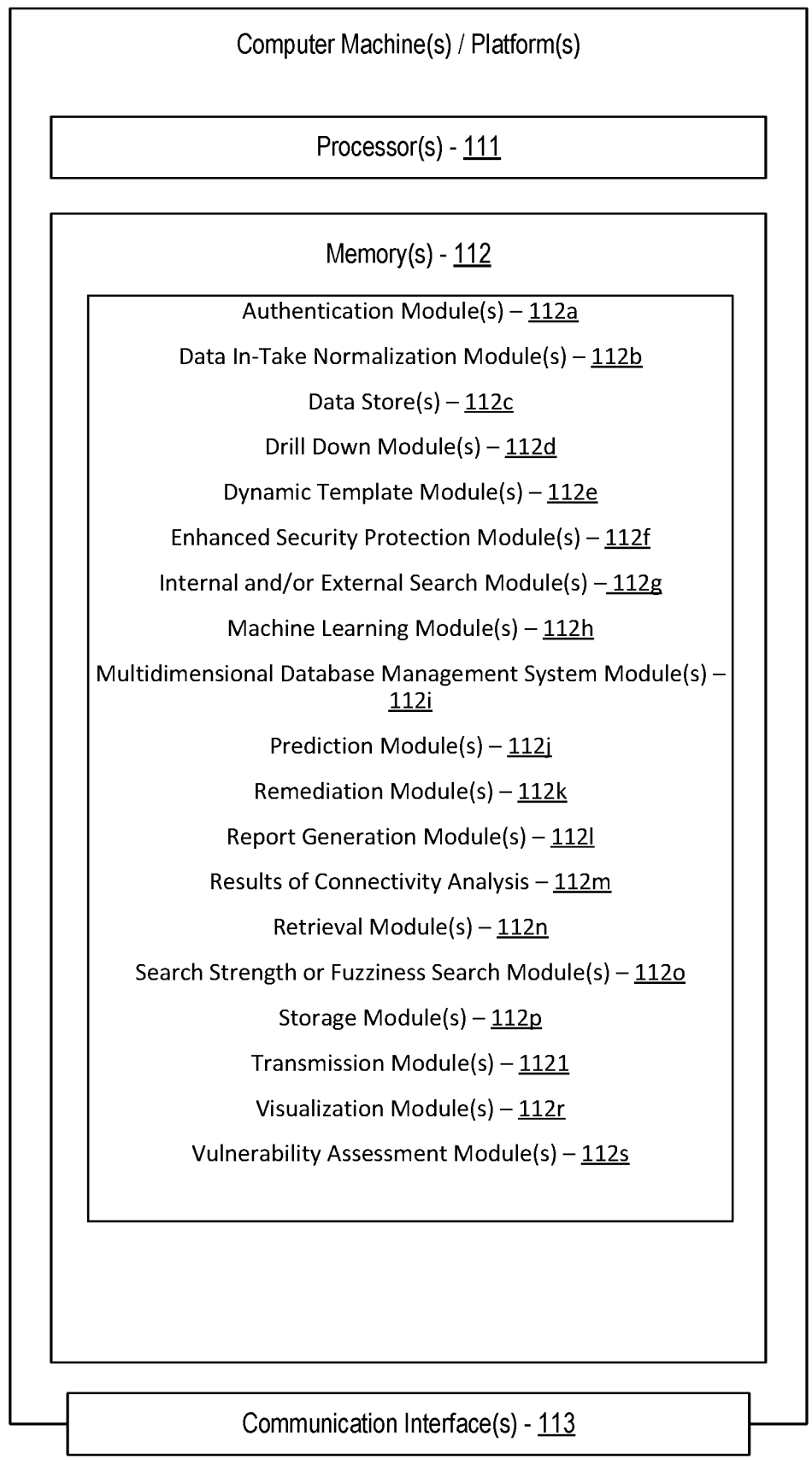

FIGS. 1A and 1B depict illustrative computing environment(s), information security computer machine(s), platform(s), and module(s), in accordance with one or more environments, for performing connectivity analysis between a plurality of users targeted with a common threat vector.

Referring to FIG. 1A, computing environment/computing platform(s) 100 may include one or more computer machines, systems, and/or platforms. For example, computing environment 100 may include various computer machines such as one or more information security computer machines 110, controlling computers and/or controlled computers 115 for distributed processing, an enterprise data storage platform 120, enterprise computing infrastructure 130, an enterprise user computing machine 140, an administrative computing machine 150, and an external computer system 160 for remote access and/or processing, or performing any other functions or actions.

As illustrated in greater detail below, each element in computing environment 100 may include one or more computing machines and associated components operating computer software and data configured to perform one or more of the functions described herein. Moreover, the functions performed by one machine or platform could be implemented on another machine or platform in the environment in accordance with one or more various embodiments of this disclosure. Computing environment 100 also includes data warehouse(s) 119 which can include various big data and information regarding users, customers, and/or employees collected from in-network data stores 116 (e.g., professional, company, human resource, accounting information, marketing, etc.), external legitimate data stores 117 (e.g., social media or online sources), and external illegitimate or unauthorized data stores 118 (e.g., misappropriated information available online and/or on the Dark Web or Dark Net networks 181).

In addition, and as illustrated in greater detail below, information security computer machine(s) 110, controlling and controlled computing machine(s) 110, enterprise computer infrastructures 130, and enterprise user computing machine(s) 140, may be configured to perform various distributed processing functions described herein as well as retrieve, process, normalize, store, access, analyze, and/or act on enterprise or other big data. Enterprise computing infrastructure 130 may include one or more computer machines and/or other computer components. In addition, and as illustrated in greater detail below, enterprise computing infrastructure 130 may be configured to provide various enterprise and/or back-office computing functions for an organization, such as a financial institution. For example, enterprise computing infrastructure 130 may include various computer machines and/or computer-executable software and/or data that store and/or otherwise contain account information, such as financial account information including account balances, transactions, transaction history, account owner information, and/or other information. In addition, enterprise computing infrastructure 130 may process and/or otherwise execute transactions on specific accounts or from various users based on commands and/or other information received from other computer systems included in computing environment 100. Additionally or alternatively, enterprise computing infrastructure 130 may load data from enterprise data storage platform 120, manipulate and/or otherwise process such data, and return modified data and/or other data to enterprise data storage platform 120 and/or to other computer machines or systems included in computing environment 100.

Information computer security machine(s) 110 may be any type of computer machine and may be linked to and/or used by a specific enterprise user (who may, e.g., be an employee, customer, or affiliate of an enterprise organization tasked with identifying similarities between individuals who were attacked with a common threat vector). Enterprise user computing device 140 may be any type of computer machine and may be linked to and/or used by a specific enterprise user (who may, e.g., be an employee or other affiliate of an enterprise organization controlling and/or interacting with, controlling and controlled computing device(s) 115 or any other computer machines). Administrative computing device 150 may be any type of computer machine and may be linked to and/or used by an administrative user (who may, e.g., be a network administrator of an enterprise organization controlling and/or interacting with master and slave computing device(s) 115 or any other computer machines). Enterprise computer system 160 may be any type of computer machine and may be linked to and/or used by one or more external users (who may, e.g., not be associated with an enterprise organization controlling and/or interacting with master and slave computing device(s) 115 or any other computer machines).

Computing environment 100 also may include one or more networks, which may interconnect one or more of information security computer machine(s) 110, master and slave computer machine(s) 115, in-network data store(s) 116, external legitimate data stores 117, external illegitimate data stores 118, data warehouse(s) 119, enterprise data storage platform 120, enterprise computing infrastructure 130, enterprise user computing device 140, administrative computing device 150, and external computer system 160. For example, computing environment 100 may include a private network 170 (which may, e.g., interconnect information security computer machine(s) 110, data warehouse 119, in-network data store(s) 116, controlling and controlled computer machine(s) 115, enterprise data storage platform 120, enterprise computing infrastructure 130, enterprise user computing device 140, administrative computing device 150, and/or one or more other computer machines or systems, which may be associated with an organization, such as a financial institution), and public network 180 (which may, e.g., interconnect external computer system 160 with private network 170 and/or one or more other computer machines, systems, public networks, sub-networks, and/or the like). Computing environment 110 may include one or more firewalls 175, which protect or filter data for machines, platforms, and data inside the private network from unauthorized users or processes operating outside the private network. Information security computer machine(s) 110 may also access via public network(s) 180 one or more external legitimate data store(s) 117, the Dark Web/Dark Net networks 181, and external illegitimate data store(s) 118 such as, for example, those that may be stored on online or on the Dark Web/Dark networks 181.

In one or more arrangements, computer machines and the other systems included in computing environment 100 may be any type of computing device capable of providing a user interface, receiving input via the user interface, acting on the input, accessing or processing data, controlling other computer machines and/or components thereof based on the input, and communicating the received input to one or more other computing machines. As noted above, and as illustrated in greater detail below, any and/or all of the computer machines of computer environment 100 may, in some instances, be special-purpose computing devices configured to perform specific functions.

Referring to FIG. 1B, one or more computer machines or platforms, such as, for example, any of those identified in FIG. 1A, may include one or more processors, executors, cores, etc. 111, memory 112, and communication interface 113. A data bus may interconnect processor 111, memory 112, and communication interface 113. Communication interface 113 may be a network interface configured to support communication between one or more computer machines in computer environment 100 and one or more networks (e.g., private network 170, public network 180, Dark Web/Dark Net networks 181, or the like). Memory 112 may be volatile or non-volatile, and may include computer software and data such as, for example, one or more program modules having instructions that when executed by processor 111 cause a computer machine, such as information security computer machine(s) 110, to perform one or more functions described herein and/or access, process, analyze, manipulate, interact with, perform data acquisition, and/or control one or more data stores or data warehouses, big data, or other file systems that may store and/or otherwise maintain information which may be used by such program modules and/or processor 111. In some instances, one or more program modules, data, and/or databases may be stored by and/or maintained in different memory units (local or accessible across the network) of computer machines and/or by different computing devices that may form and/or otherwise make up a collection of computer machines.

Sample program modules, data, and/or databases stored or maintained in memory may include, but are not limited to: authentication module(s) 112a (e.g., to securely access password protected or other secured data); data in-take normalization module(s) 112b (e.g., to match big data or flat file fields to desired data structures, field names, and variables); data store(s) 112c (e.g., housing big or other data); drill down module(s) 112d (e.g., to drill down on data sets or clustered data to provide additional information on demand); dynamic template module(s) 112e (e.g., to provide a framework for data ingestion into data warehouse(s) in the preferred multidimensional data structure formats); enhanced security protection module(s) 112f (e.g., to adjust user rights or implement heighten security measures for individuals or accounts attacked with the common threat vector); internal and/or external search module(s) 112g (e.g., for searching big data in data warehouse(s) or other stores to identify connectivity clusters of data that may provide information on who was targeted, how they were targeted, and why there were targeted); machine learning module(s) 112h (e.g., to learn from past attacks and make system improvements for data fields to acquire, store, search, and analyze, or to make other process or system improvements); multidimensional database management system module(s) 112i (e.g., to manage big data, perform data acquisition, and implement searches of big data in data warehouse(s)); prediction module(s) 112j (e.g., to attempt to identify other individuals who may be targeted in future); remediation module(s) 112k (e.g., to attempt to address user, account, or system vulnerabilities); report generation module(s) 112l (e.g., to present the results of the connectivity or data acquisition analysis for use by enterprise or other authorized users); results of connectivity analyses 112m (e.g., data sets stored in memory relating to the connectivity analysis performed on the big data sources); retrieval module(s) 112n (e.g., to data mine and perform data acquisition); search strength or fuzziness search module(s) 112o (e.g., to provide flexibility in searching and analysis of big data stored in data warehouse(s)); storage module(s) 112p (e.g., for storing big data and variables in memory or data warehouse(s)); transmission module(s) 112l (e.g., to securely transmit queries and results to and from enterprise users or other authorized individuals)); visualization tool module(s) 112r (e.g., to graphically represent search results, analyses performed, and allow investigation and manipulation of data); and vulnerability assessment module(s) 112s (e.g., to access the vulnerability of individuals, accounts, systems, or data to common threat vectors). These modules, data, and databases are described in more detail below in reference to other figures.

In order to be able to quickly identify connections between people attacked with a common threat vector, it is preferable to include as much public and non-public information, as technically possible and as individually authorized by users, into data warehouse(s) 119 for analysis. The more information that is included in the data warehouse 119, the more likely it is that hidden connections between the attacked users or other useful information can be identified.

Figure 2A:
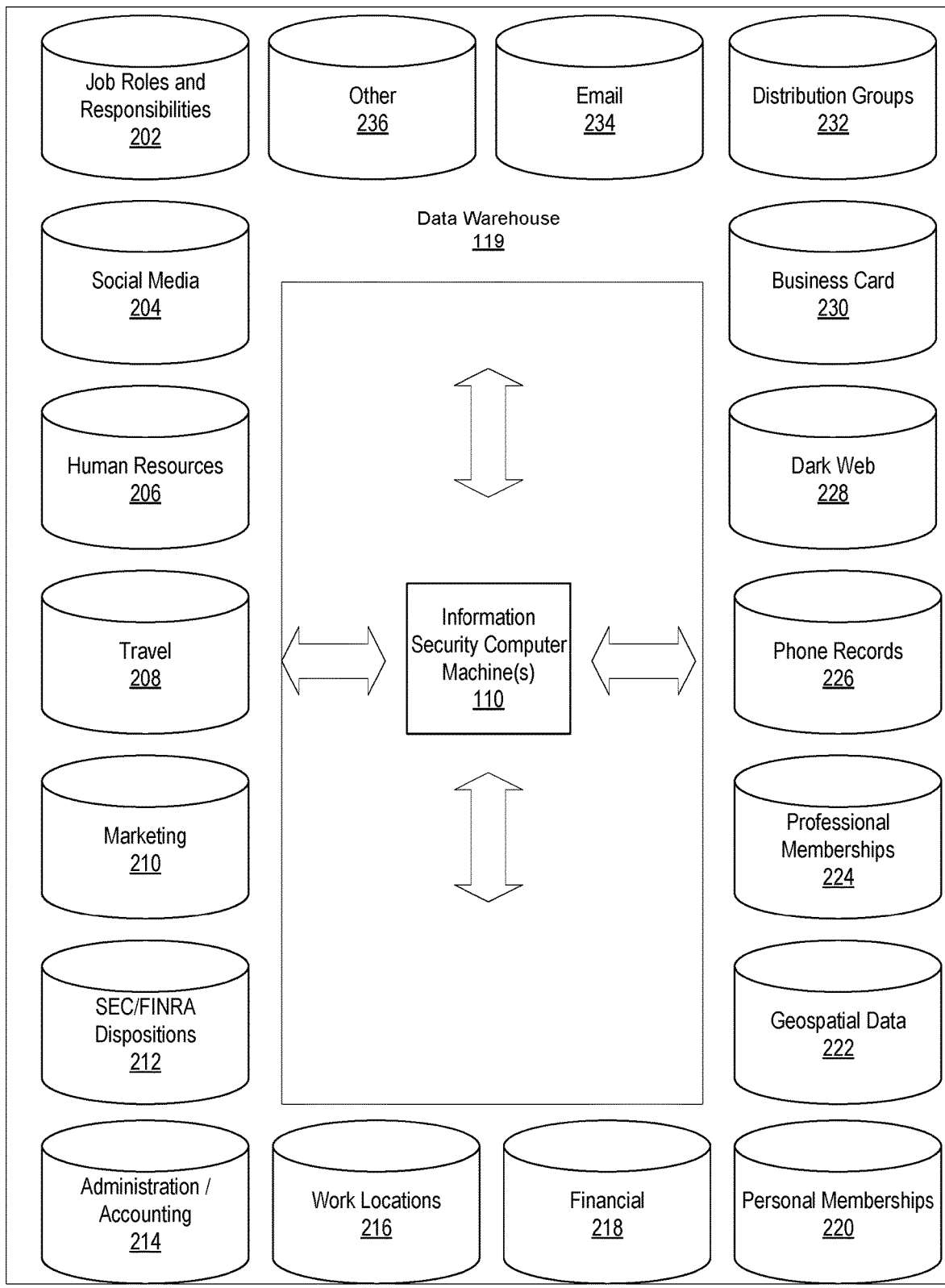
FIG. 2A depicts various sample data stores that may be accessible by an information security computer machine(s) or that may be utilized in conjunction with an information computer security platform(s) in accordance with one or more embodiments.
Figure 2B:
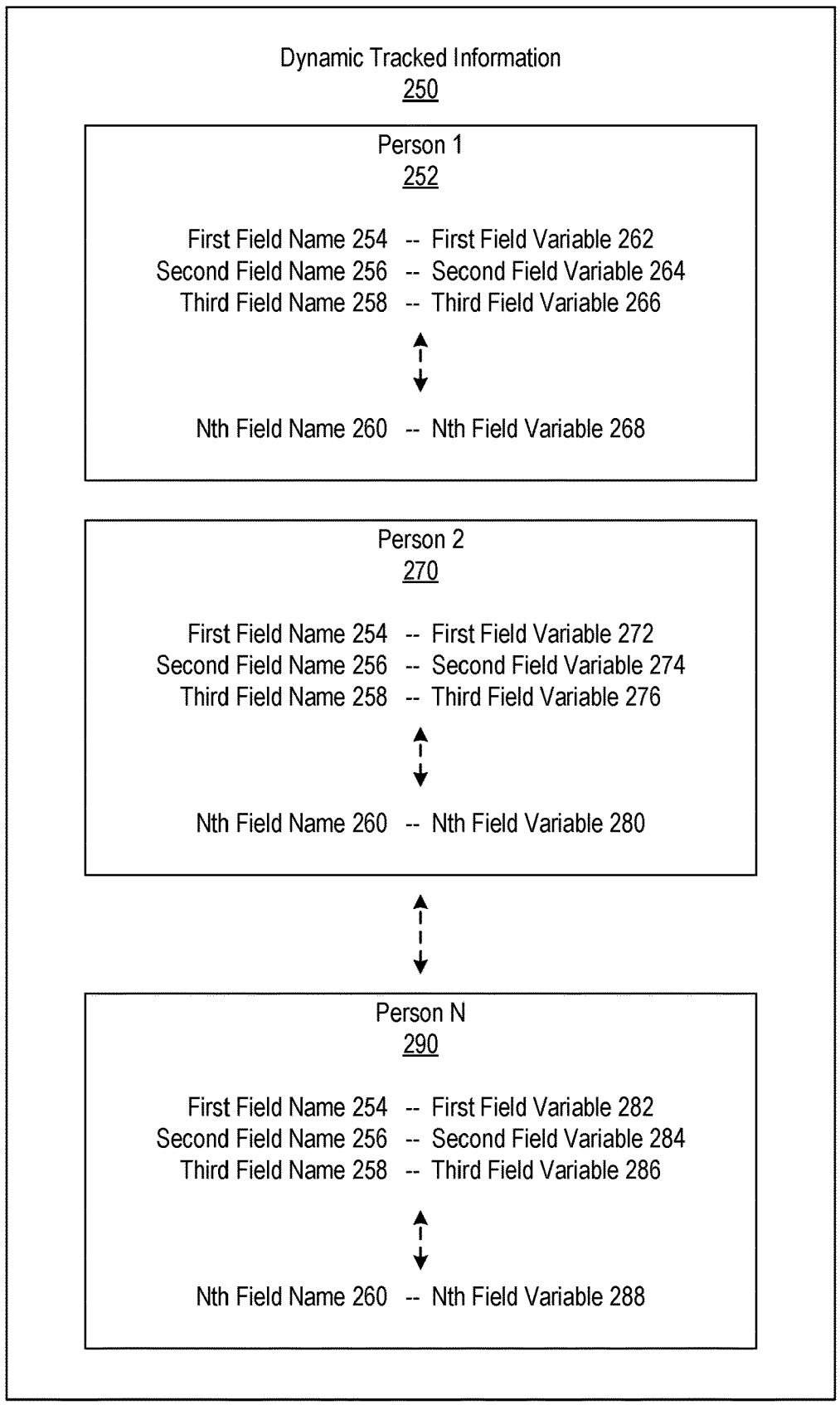
FIG. 2B depicts examples of the types of fields and variables corresponding to employee or user information that may be tracked and/or stored statically or dynamically in various data warehouses and/or data structures in accordance with one or more embodiments.

In this regard, as illustrated in FIG. 2B, data mining and data acquisition from many disparate data sets is preferable. These datasets and/or data sources may include, for example, data relating to one or more of a person's job roles and responsibilities 202, social media 204 (e.g., LinkedIn or other profiles or postings, or other online sources), human resources 206 (e.g., information in the possession of an HR department), travel 208 (e.g., logs of a user's business or personal travel to various cities or conferences), marketing 210 (e.g., a user's marketing activities in which his/her name or marketing information may have been made public), dispositions by the Security and Exchange Commission or the Financial Industry Regulatory Authority 212 (e.g., to cross-reference for threat actors who have violated SEC/FINRA rules in the past), administration and accounting records 214 (e.g., logging expense reports and business expenses such as, for example, restaurants visited or merchants from whom purchases were made), work locations 216 (e.g., cities and states where the personal works or worked), financial 218 (e.g., financial transactions, companies involved, accounts, account numbers, transaction dates, transfers, withdrawals), personal memberships 220 (e.g., organizations, groups, or affiliations with which a person has a relationship), geospatial data 222 (e.g., any information available regarding any activities by a person in a particular geographical location or area at a particular time that may or may not relate to any event), professional memberships (e.g., organizations or associations relating to the person's profession), phone records 226 (e.g., logs of incoming and outgoing telephone calls to a business or personal line, including those that were from spammers or telemarketers), Dark Web information 228 (e.g., any type of personal or business information misappropriated from the individual or regarding the individual that is available for illegal sale or access on the Dark Web or other online source), business card information 230 (e.g., the individuals to whom business cards were distributed, where they were distributed, which conference they were distributed at, etc.), distribution group information 232 (e.g., email distribution groups or distribution lists for documents, emails, or information), email records 234 (e.g., lists of email addresses to which emails were sent or from which emails were received), or any other 236 type of information relating to any professional, personal, or other aspect of a person's life that may be helpful in detecting, analyzing, remediating, learning from, or preventing criminal, cyber, or fraudulent activity. The foregoing data may be stored in a single location such as a data warehouse 119 like shown in FIG. 1A or spread across multiple data warehouses or data stores such as shown in FIG. 2A. And, this information may be accessible from information security computer machine(s) 110 or other suitable enterprise or other computers. Tasks included in one or more embodiments may be consolidated in information security computer machine(s) 110 or may be distributed across one or more other computers as desired.

Referring to FIG. 2B, a simplified two-dimensional illustration of how information can be tracked and/or data mined dynamically is shown. In essence, for each person 252, 270, 290, a plurality of fields with field names 254, 256, 258, 260 can be identified and corresponding variables 262, 264, 266, 268/272, 274, 276, 278/282, 284, 286, 288 can be populated based on data acquired from the disparate data sources. Each field name and corresponding variable could be considered as a template. During data acquisition, relevant information corresponding to each field can be identified as part of data input, normalized to fit into a desired data structure format, and stored as the corresponding variables in the data structure. As an example, for records regarding business conferences, the first field name 254 might be a conference name, the second field name 256 might be the conference location (e.g., Las Vegas), the third field name 258 might be the conference date (e.g., Aug. 19, 2019), and so on. Other fields could contain information regarding conference attendees, individuals to whom business cards were given, biographical or other information shared at the conference, the names of any materials distributed in the conference, a list of electronic devices used at the conference, a list of logins or accounts or data accessed while at the conference, etc. A personal of skill in the art would recognize that myriad details could be captured and stored for this or any other event, occurrence, human resource record, financial transaction, social media post, email, phone log, business trip, administration or accounting record, etc. such as identified in potential data stores shown in FIG. 2A.

Figure 2C:
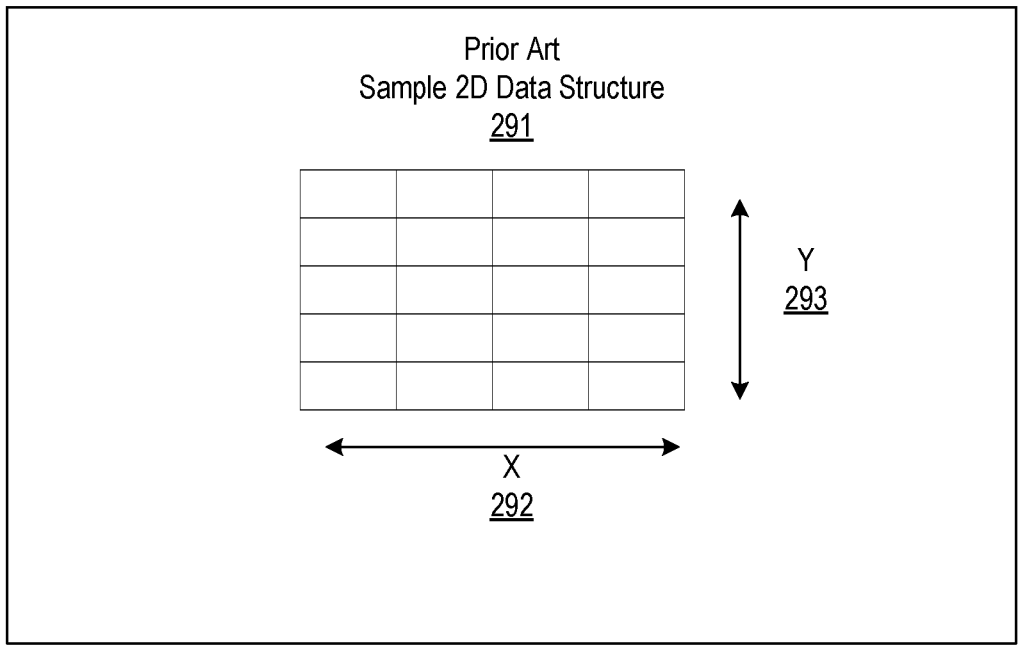
FIG. 2C depicts a prior art two-dimensional data structure for storage of data.

The simplest implementation of storage of data such as in FIG. 2A can be seen in prior art two-dimensional data structures such as array 291 in FIG. 2C. Thus, as an example for a particular person, events could be stored in an array along an X-axis 292 and dates for the corresponding events could be stored in the array along a Y-axis 293. However, this type of prior art storage array is inefficient due to the extreme volume of big data to be acquired, normalized, stored, searched, and analyzed.

Figure 2D:
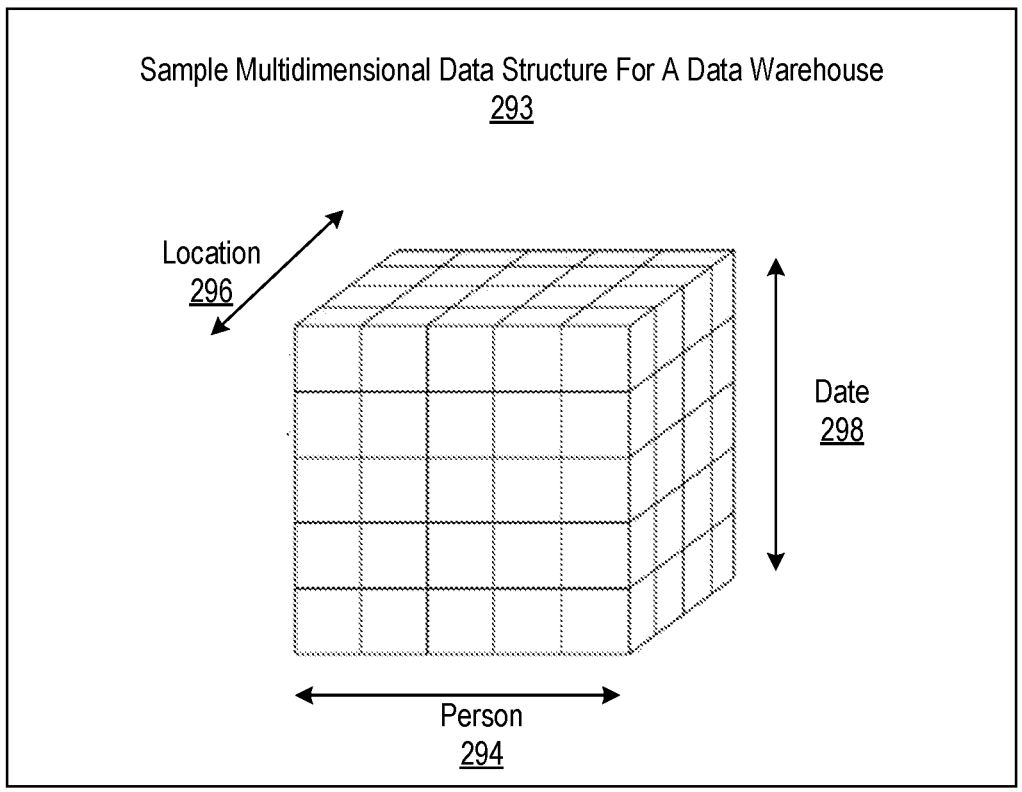
FIG. 2D depicts a sample three-dimensional data structure for data warehouse(s) used in accordance with one or more embodiments.

Instead, multidimensional data structures and/or hypercubes are preferred for use in one or more data warehouses 119. An example of a three-dimensional data structure is shown in FIG. 2D. This type of data structure could capture multiple variables at the same time such as the person name 294, the location of an event 296, and the date of the event 298. Persons of skill in the art will appreciate that data structures used in one or more embodiments should preferably be at least three dimensional or more.

Multidimensional databases are types of databases that are optimized for data warehouse and OLAP applications such as described herein. Oftentimes, the information that is to be acquired and imported into the multidimensional databases can be accessed and created from using input from existing relational databases or other data sources. Conceptually, a multidimensional database or data warehouse as contemplated herein can use the idea of a data cube, such as shown in FIG. 2D, to represent the dimensions of data available for a particular user. The multidimensional database can be expanded to include additional dimensions in order to capture and be able to search even more related data and variables such as illustrated in the sample four-dimensional 297 and five-dimensional 299 data structures respectively in FIGS. 2E and 2F, or larger multidimensional data structures (not shown).

Figure 2E:
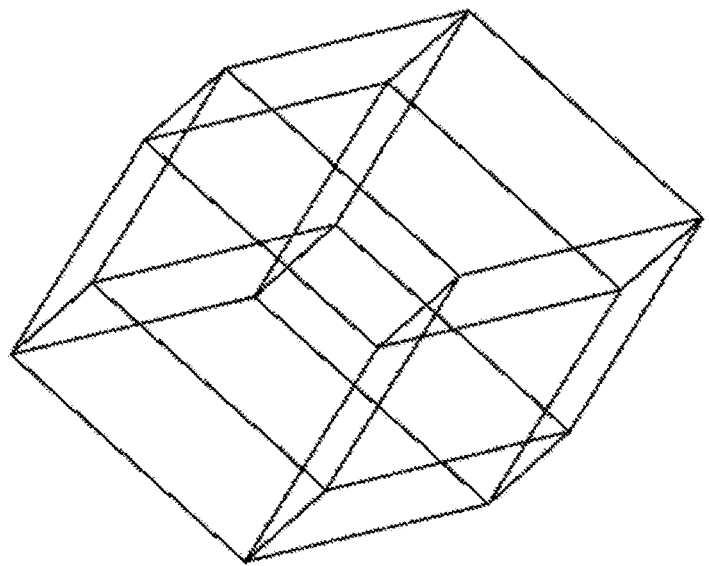
FIG. 2E depicts a sample four-dimensional data structure and/or hypercube for data warehouse(s) used in accordance with one or more embodiments.
Figure 2F:
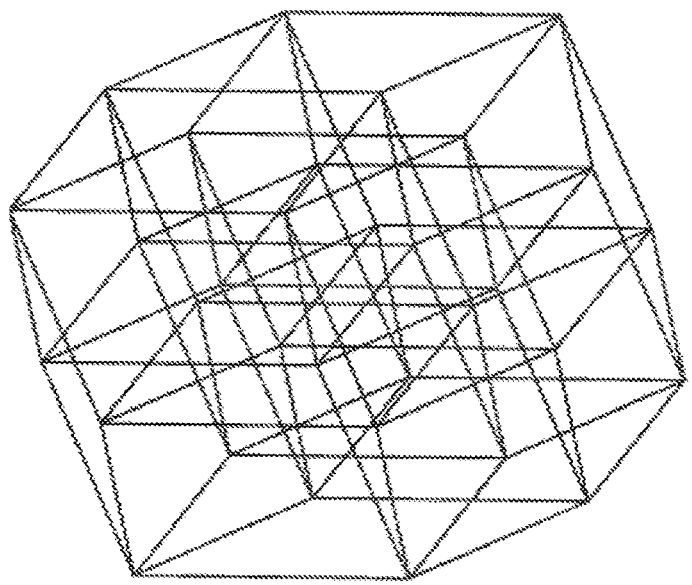
FIG. 2F depicts a sample five-dimensional data structure and/or hypercube for data warehouse(s) used in accordance with one or more embodiments.

Persons of skill in the art will recognize that such multidimensional databases and/or data structures may constitute hypercube(s), which can be considered to be generalizations of a three-dimensional cube like shown in FIG. 2D to an arbitrary "n" dimensions like in FIGS. 2E and 2F. As many dimensions as desired can be added to the database and data structure based on a designer's preferred implementation to capture all appropriate or desired data and optimize efficiency of data acquisition, data storage, searching, performing connectivity analyses, and retrieval of data. All such multidimensional hypercubes for use in the data warehouse(s) of this disclosure are considered within the scope of the inventions.

Figure 3:
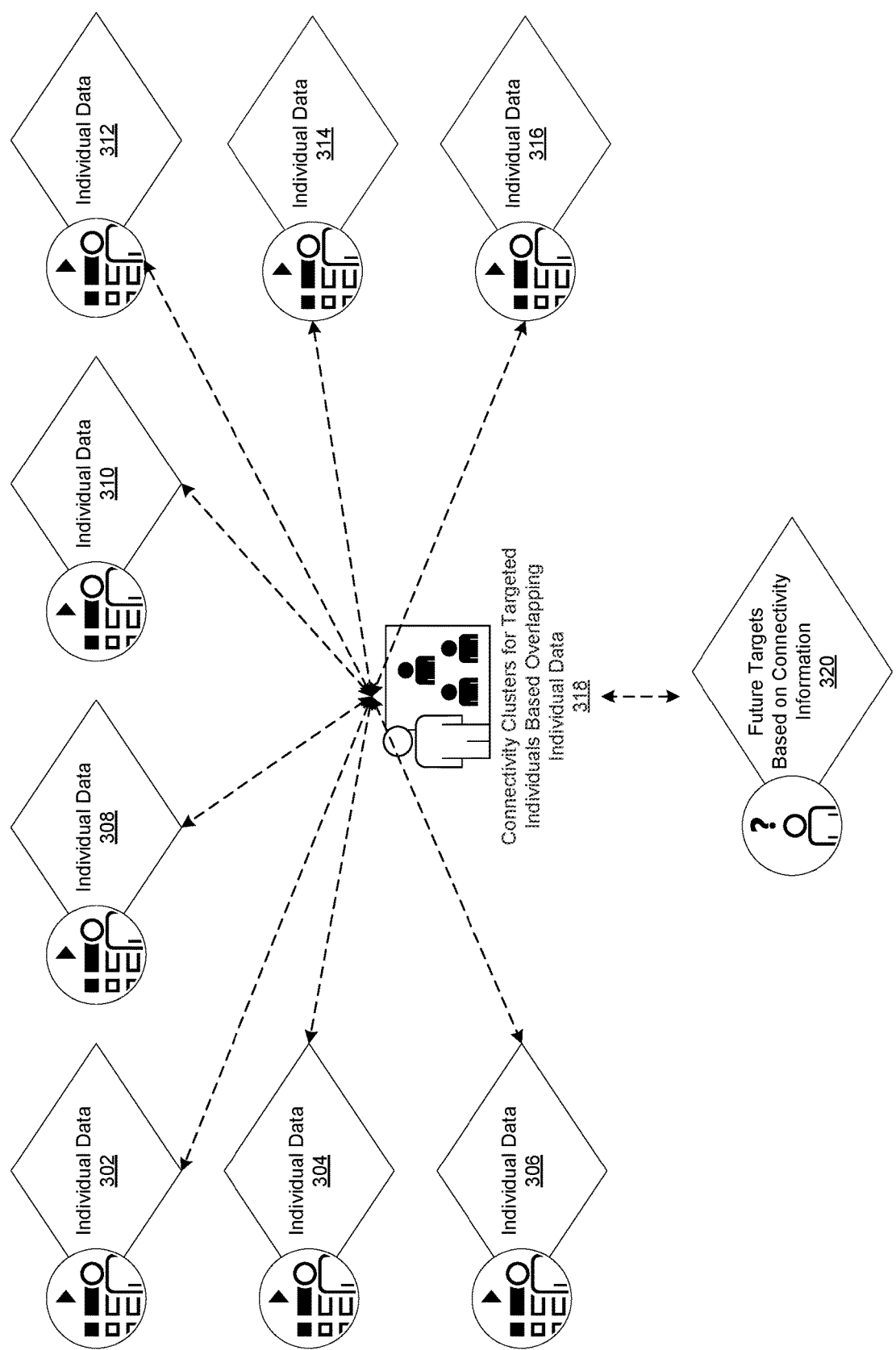
FIG. 3 depicts a high-level representation of a connectivity analysis, in accordance with one or more embodiments, identifying clusters of data for users targeted with a common threat vector and for predicting other individuals who may be targeted in the future with the same threat vector or for other use of the data.

FIG. 3 depicts a high-level representation of a connectivity analysis, in accordance with one or more embodiments, identifying clusters of data for users targeted with a common threat vector and for predicting other individuals who may be targeted in the future with the same threat vector or for performing other relevant analyses or processes (not shown). Multidimensional data structures (e.g., hypercubes) store data in one or more data warehouse(s) 119 corresponding to many individuals. As shown in the example of FIG. 3, if a threat vector is identified with respect to eight people out of a group of myriad individuals, all of the individual data relevant to each user (e.g., 302-316) in data warehouse(s) 119 can be searched, retrieved, and analyzed by information security computer machine(s) in order to identify connectivity clusters based on overlapping data variables. This information can then be used to try to determine how the threat occurred, how it was implemented, how the individuals were targeted, etc. For example, the overlapping information may reveal that each individual attended the same conference or type of conference. The conference may have been at a single site or at different sites, and could have been on the same date or a period of dates. But, by performing this connectivity analysis, the common attributes corresponding to the attacks can be identified. And, based on this example, future targets could also be identified such as anyone else who might attend this particular conference or a similar conference in the future. Such at risk individuals could then be notified. The information can be further used as part of remediation, investigation, machine learning, and/or other relevant processes.

Figure 4:
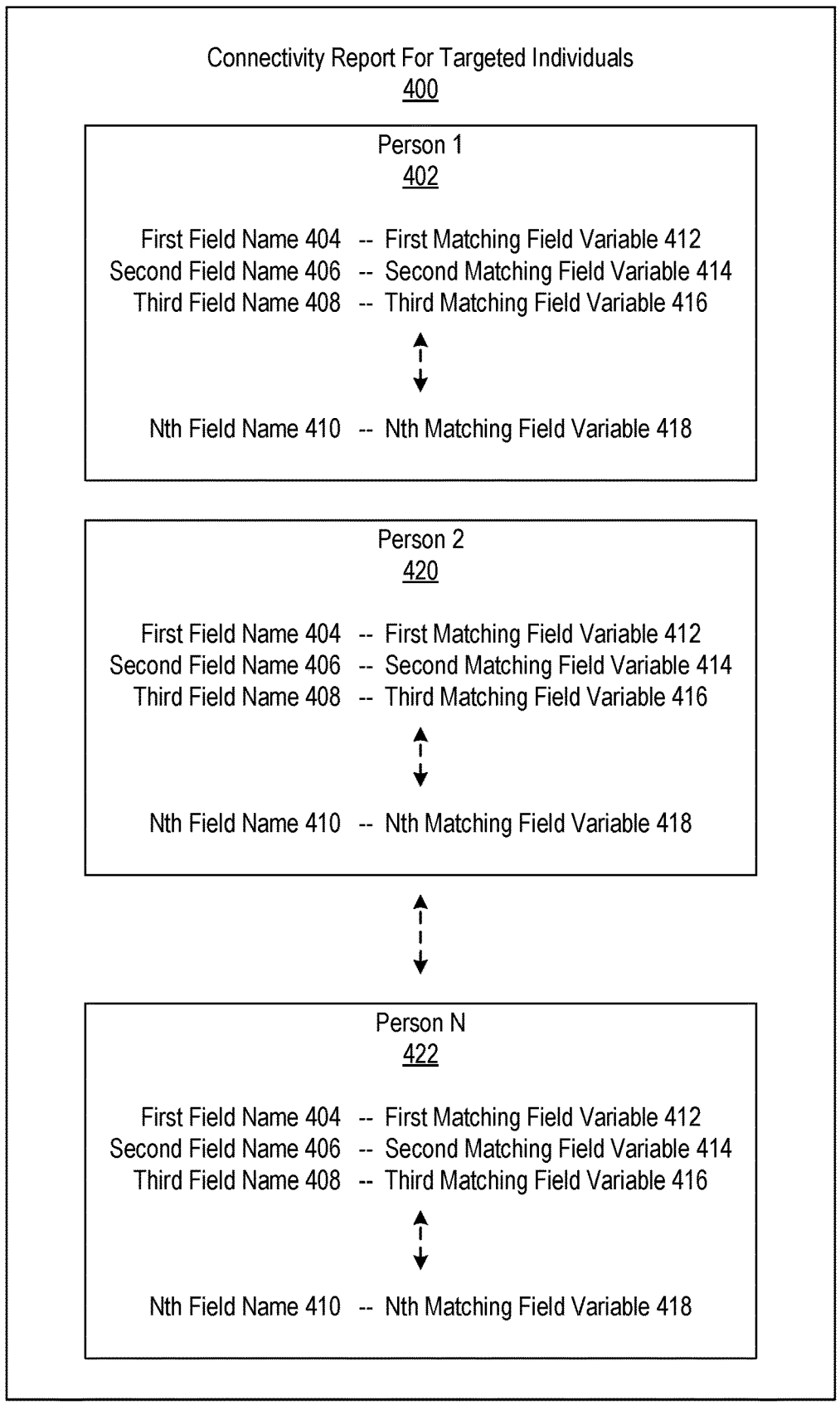
FIG. 4 depicts a sample text report of the connectivity analysis identifying common similarities in data for users targeted with a common threat vector in accordance with one or more embodiments.

FIG. 4 depicts a sample text report of the connectivity analysis identifying common similarities in data for users targeted with a common threat vector in accordance with one or more embodiments. Records for each individual 402, 420, 422 can be generated and can include each applicable field name and one or more similar or matching field variables that were detected. Further to the above example, field names 404, 406, 408 and 410 might be conference name, conference date, conference location, and conference attendees, respectively 412, 414, 416, and 418. By a simple visual inspection of the report, the enterprise user could identify the connectivity clusters between the individuals who were attacked, how the individuals were selected or targeted, and thus determine how and/or why the threat vector occurred. A person of skill in the art will understand that any type of text or graphical report could be prepared as desired. And, in the case of reports graphically illustrating the connections, drill down functionality may be provided wherein additional information regarding individuals, events, etc. could be discovered and/or displayed on demand by clicking on appropriate icons or text in the graphical or other representation.

Figure 5:
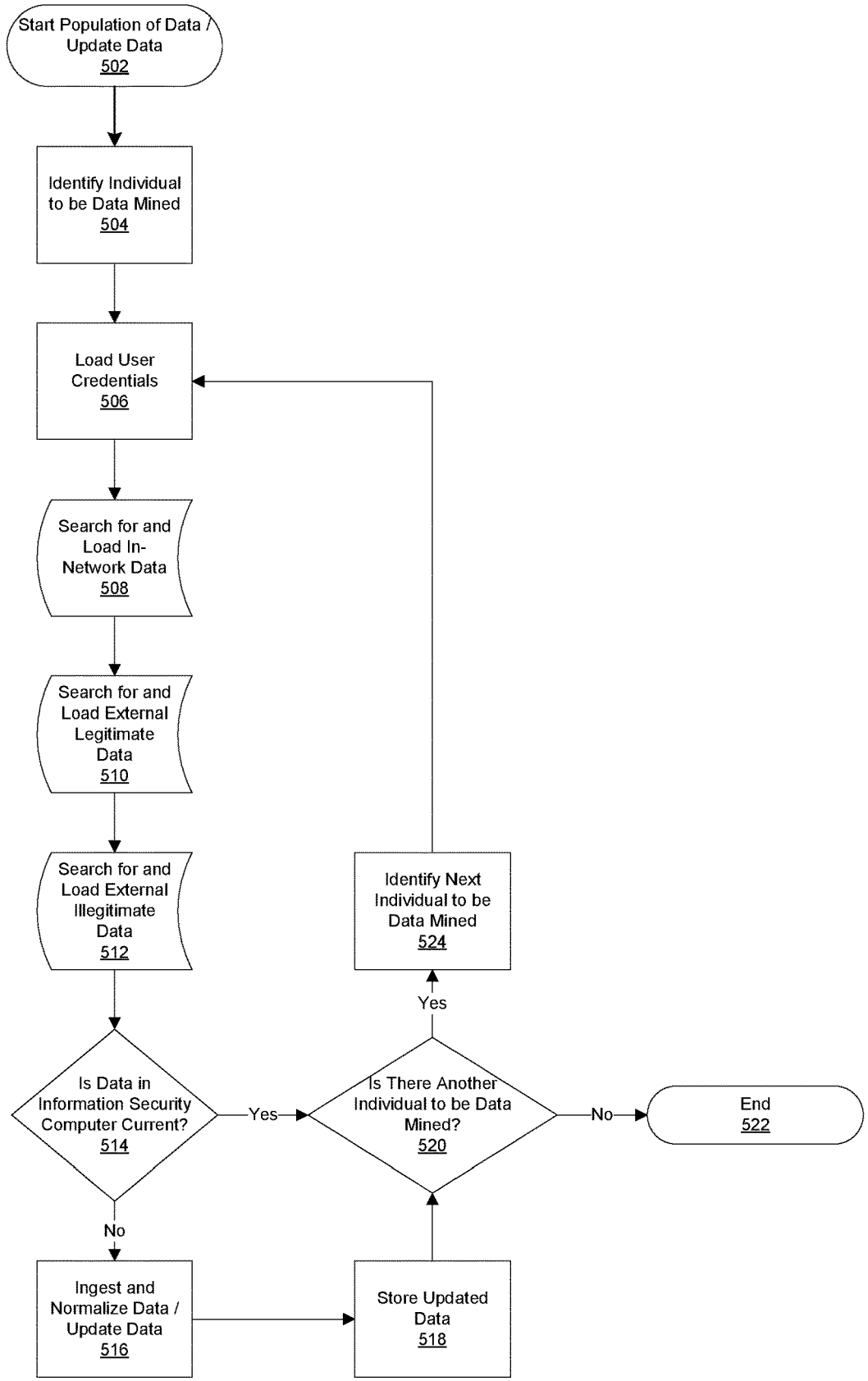
FIG. 5 depicts a sample ingestion method for populating a multidimensional data warehouse with information from internal and/or external data stores in accordance with one or more embodiments.

FIG. 5 depicts a sample ingestion method for populating a multidimensional data warehouse with information from internal and/or external data stores in accordance with one or more embodiments. As shown as in step 502, in order to start population of data in a data warehouse 119 or to update data contained in the warehouse, a first individual to be data mined or on which to perform data acquisition is identified in step 504. This can, for example, be based on a list of individuals such as employees or customers. Authorization credentials (e.g., logins, passwords, etc.) provided by the users can be retrieved securely (if provided or authorized by the individuals) and used in step 506, where necessary, to search in-network data store(s) 116 and external legitimate data store(s) 117 in step 508 and 510 to identify information corresponding to the individual. If desired, external illegitimate data stores, such as on the Dark Web, can also be searched for information corresponding to the individual in step 512.

In step 514, the information identified as a result of the search(es) can be analyzed to determine whether it is already present in the data warehouse and, if not, the information can be normalized so that it fits into the desired database template or format in step 516 and stored into the data warehouse in step 518. This process can be repeated indefinitely until all information for all individuals has been identified, acquired, and stored, such as illustrated in steps 520 and 524, and by repeating steps 506 thru 518 as appropriate.

Figure 6:
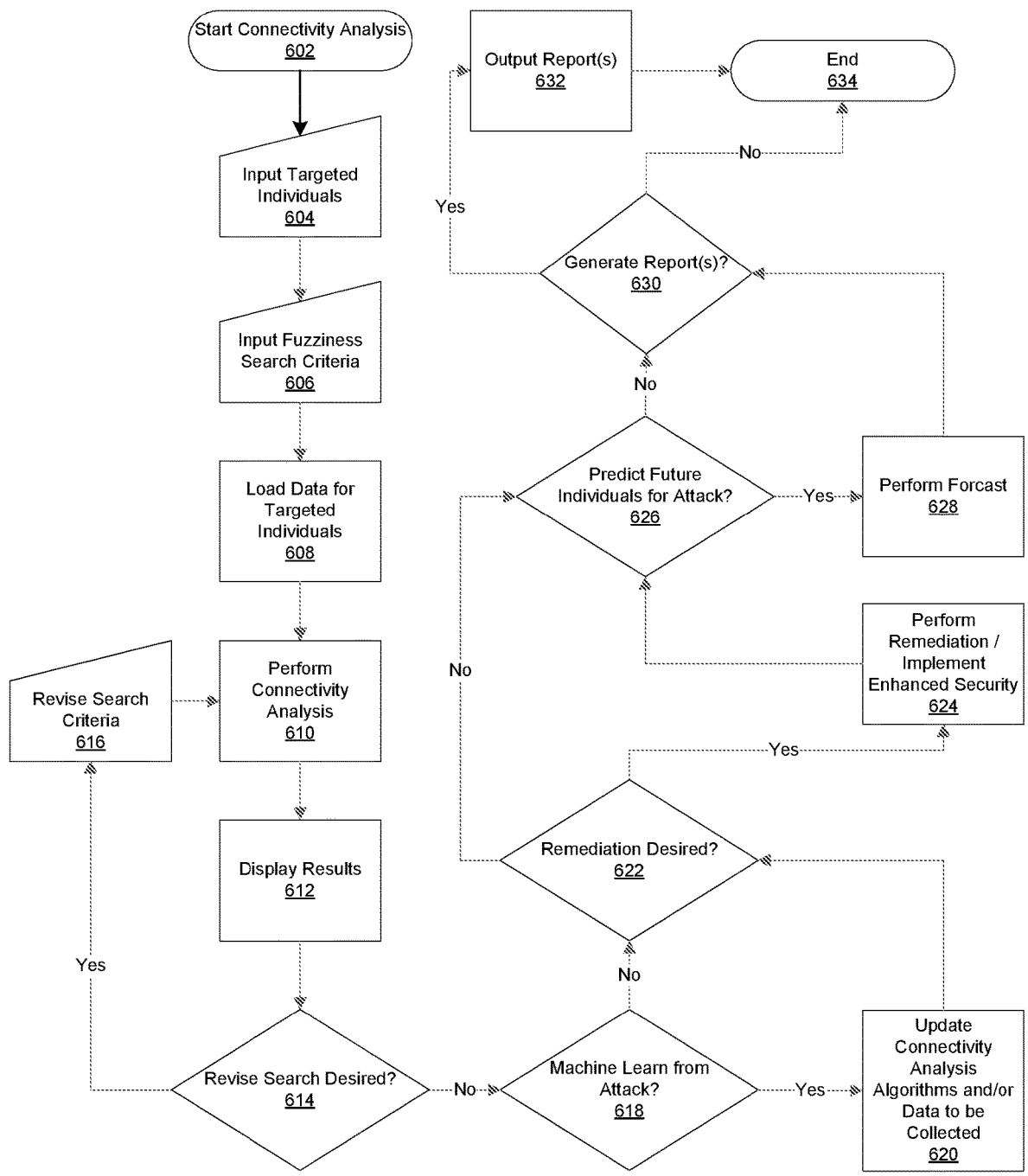
FIG. 6 depicts a sample connectivity analysis algorithm for identifying similarities in data between users targeted with a common threat vector in accordance with one or more embodiments.

FIG. 6 depicts a sample connectivity analysis algorithm for identifying similarities in data between users targeted with a common threat vector in accordance with one or more embodiments. In order to start the connectivity analysis in step 602, an enterprise user or automated system could provide an input of the users who were targeted with the common threat vector in step 604. If desired, a fuzziness search criterion could be specified in step 606. This variable could provide flexibility as to whether to require an exact match in the searched variables or only a certain percentage of a match. Data for the targeted individuals could be loaded from the data warehouse into memory on the information security computer machine in step 608. The information security computer machine(s) could then analyze the loaded data in order to identify connectivity information or relationships in step 610. The results of the data could be displayed in step 612. An enterprise user could be provided an opportunity to revise and repeat the search if the results were not as desired in steps 614 and 616.

After the search(es) are completed, a determination could be made whether there is information to machine learn based on the search results in step 618. The determination could be made automatically or based on input from an enterprise user. As an example, it may be determined that there is an additional variable that should be added to the multidimensional data structure and should be tracked and updated in the future for all individuals to account for this particular type of threat or other threat. In this regard, the data storage fields and multidimensional data structures could be considered to be dynamic as opposed to static. If appropriate, the connective analysis algorithm or the data structures could then be modified to capture the additional data desired in the future in step 620.

A determination may be made in step 622 whether some form of remediation should be performed. Again, this determination can be made automatically or based on input from an enterprise user. As an example, it could be detected as part of the connectivity analysis that the threat vector originated from emails received from the same email address or IP address. As part of the remediation in step 624, firewall(s) 175 may be updated to block the offending email address or IP address. Additionally or alternatively, enhanced security measures could be implemented in step 624 for the individual based on the threat vector that was used and the results of the connectivity analysis. These enhanced measures, for example, could be related to limiting or restricting user account rights regarding the handling of emails, the access to documents or information inside the network, restricting certain types of financial transactions, preventing new accounts from being created without express authorization (such as in the case of issuing fraud alerts to credit reporting agencies), or any other prudent enhanced security measure.

Depending on the particular connectivity information identified, it may be possible to predict future attacks by identifying at risk individuals if desired as in step 626. As an example, such as the previously discussed problematic conference, a search of calendar information for employees may identify individuals scheduled to attend the same or a similar conference in the future such as in step 628. Those individuals could then be notified to take appropriate precautions or to avoid the conference.

If desired, reports of the connectivity analysis can be generated in step 630 and output to desired users in step 632. The report results could be displayed, transmitted, or distributed as desired.

Figure 7:
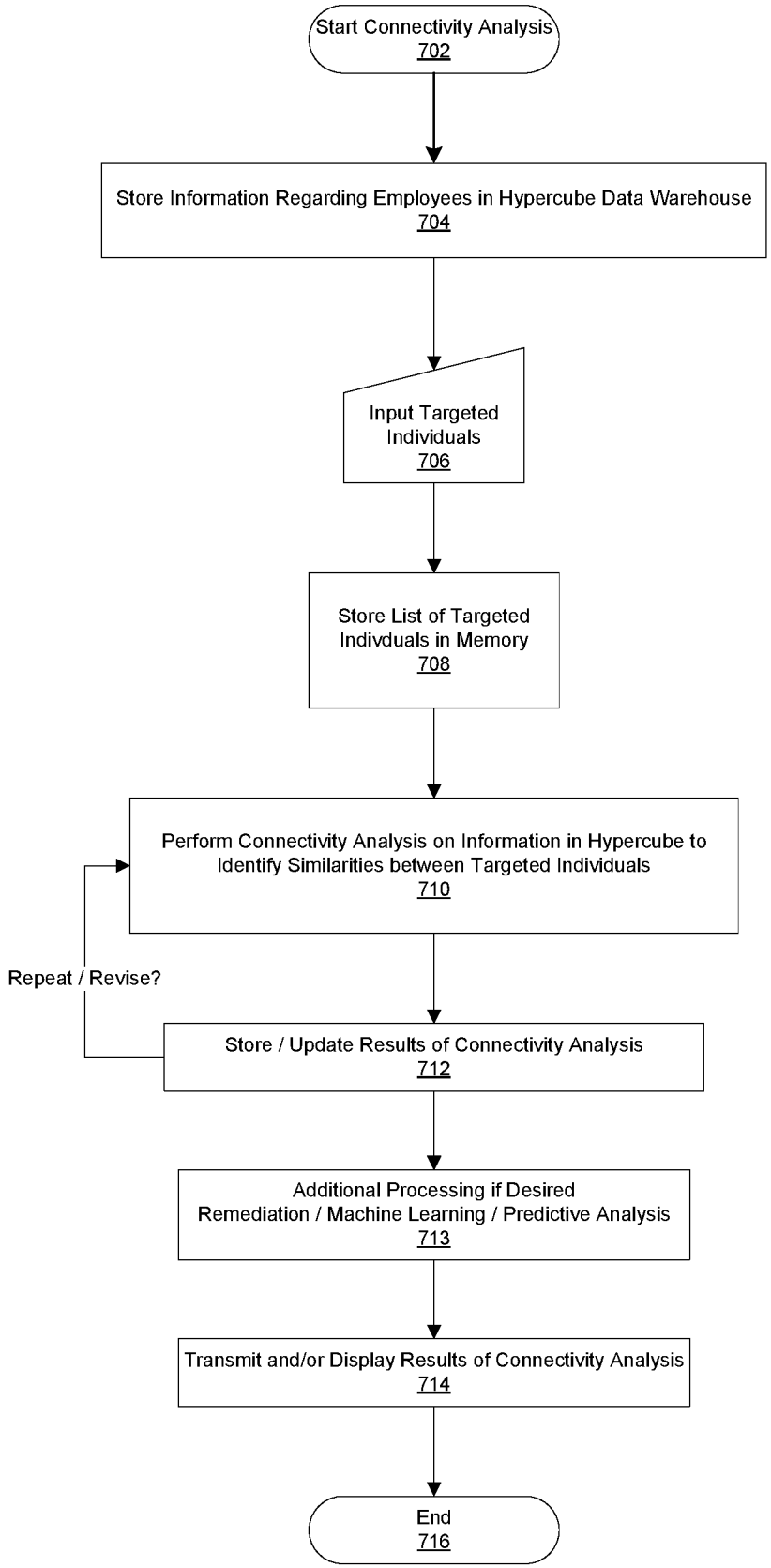
FIG. 7 depicts a sample high-level implementation of a method of performing connectivity analysis between users targeted with a common threat vector in accordance with one or more embodiments from a pseudo code perspective.

Referring to FIG. 7, a sample high-level implementation of a method of performing connectivity analysis between users targeted with a common threat vector in accordance with one or more embodiments is shown from a pseudo code perspective. The general functional steps are:

Initialization: the process can be started manually on-demand, automatically based on a triggered or detected event, based on a schedule, or as part of batch processing as in step 702. The process can be performed in real time if desired.

Data acquisition: information regarding all individuals (or as much as is desired) is identified, normalized to fit desired fields in a dynamic template for data to be input or acquired into the data warehouse, and stored in a hypercube or other multidimensional data structure in step 704.

Input of targeted individuals: people who were the target of a common threat vector can be input manually entered by an enterprise user or can be automatically identified in response to a triggered or detected event (or other automatic identification) as in step 706.

Storage of targeted individuals: the list of attacked people can be stored in memory for efficient processing in step 708 or for future use.

Connectivity analysis: information in the data warehouse can be searched and accessed for the targeted individuals in order to identify the connectivity clusters of common data connecting the individuals with respect to the particular common vector attack as in step 710. The search may require identical matches or allow for a fuzziness percentage or reliability factor in order to increase the odds of matches.

Results of connectivity analysis: the results of the search and analysis can be stored in memory in step 712. The connectivity analysis may also be revised and/or repeated as desired.

Additional processing: further processing can be performed regarding searching, analysis, security improvements, and predictions such as, for example, remediation, machine learning, and predictive analysis, and/or vulnerability assessments, etc. as in step 713.

Transmission of results: the results can be transmitted to the enterprise user who requested the search and/or can be displayed for viewing in step 714. Graphical manipulation and drill down functionality can be utilized and facilitate review and analysis of the results by an enterprise user, IT professional, fraud investigator, or other authorized person.

One or more aspects of the disclosure may be embodied in computer-usable data or computer-executable software or instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer-executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers, computing platforms, and/or one or more networks. The functionality may be distributed in any manner or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. An information security computing platform for performing connectivity analysis between a plurality of users targeted with a common threat vector, said information security platform having access to at least one external legitimate data store containing second user information, said information security platform and said at least one external legitimate data store coupled to a network, said computer platform comprising:
   a. at least one processor;
   b. at least one in-network data store containing first user information, said at least one in-network data store coupled to the network;
   c. at least one data warehouse coupled to the network, said at least one data warehouse has at least three-dimensional data storage;
   d. a communication interface communicatively coupled to the at least one processor and the network;
   e. at least one firewall included in the network, said at least one firewall protecting said at least one processor, said at least one in-network data store, and said at least one data warehouse; and
   f. a non-transitory computer-readable medium with computer-executable instructions stored thereon that, when executed by the at least one processor, cause the information security computing platform to:
      i. retrieve, via the communication interface, from said at least one in-network data store, said first user information;
      ii. store, in said at least one data warehouse, said first user information;

iii. retrieve, via the communication interface, from said at least one external legitimate data store, said second user information;
iv. store, in said at least one data warehouse, said second user information;
v. receive, via the communication interface, from a supervisory enterprise user computing device, a list of targeted users attacked with the common threat vector;
vi. search, via the communication interface, the at least one data warehouse, for a subset of the first user information and the second user information which correspond to the list of targeted users;
vii. retrieve, via the communication interface, from the at least one data warehouse, the subset corresponding to the list of targeted users;
viii. store, on the computer-readable medium, the subset corresponding to the list of targeted users;
ix. identify, by the at least one processor, similar data in the subset of the first user information and the second user information that the targeted users have in common;
x. store, on the non-transitory computer readable medium, the similar data; and
xi. transmit, via the communication interface, from the information security computing platform to the supervisory enterprise user computing device, the similar data, wherein transmitting the similar data to the supervisory enterprise user computing device causes the supervisory enterprise user computing device to display a graphical visualization of results of the connectivity analysis based on the similar data in order to identify the common threat vector to the supervisory enterprise user computing device to allow evaluation of each common threat vector.

2. The information security computing platform of claim 1 wherein the data structure of the at least one data warehouse is at least one hypercube.

3. The information security computing platform of claim 2 wherein the non-transitory computer-readable medium with multidimensional management computer-executable instructions stored thereon that, when executed by the at least one processor, cause the information security computing platform to manage the at least one data warehouse.

4. The information security computer platform of claim 3 wherein the first information is comprised of internal company information regarding a plurality of employees.

5. The information security computer platform of claim 4 wherein the internal company information includes:
   a. human resources information corresponding to said plurality of employees;
   b. travel information corresponding to said plurality of employees;
   c. marketing information corresponding to said plurality of employees;
   d. accounting information corresponding to said plurality of employees;
   e. telephone information corresponding to said plurality of employees;
   f. email information corresponding to said plurality of employees; and
   g. geospatial information corresponding to said plurality of employees.

6. The information security computer platform of claim 4 wherein the second information is comprised of social media information corresponding to said plurality of employees.

7. The information security computer platform of claim 5 wherein the second information is comprised of social media information corresponding to said plurality of employees.

8. The information security computing platform of claim 6 wherein the non-transitory computer-readable medium contains enhanced-security computer-executable instructions stored thereon that, when executed by the at least one processor, cause the information security computing platform to: implement, by the at least one processor based on the similar data, enhanced security measures for the plurality of users targeted with the common threat vector.

9. The information security computing platform of claim 6 wherein the non-transitory computer-readable medium contains prediction computer-executable instructions stored thereon that, when executed by the at least one processor, cause the information security computing platform to:
   a. predict, by the at least one processor based on the similar data, additional users who may be targeted by the common threat vector;
   b. store, on the non-transitory computer readable medium, a list of the additional users; and
   c. transmit, via the communication interface, from the information security computing platform to the supervisory enterprise user computing device, the list of additional users, wherein transmitting the list of additional users to the supervisory enterprise user computing device causes the supervisory enterprise user computing device to display the list of additional users who may be targeted by the common threat vector to allow evaluation of each common threat vector.

10. The information security computing platform of claim 6 wherein the non-transitory computer-readable medium contains machine-learning computer-executable instructions stored thereon that, when executed by the at least one processor, cause the information security computing platform to: machine-learn, by the at least one processor based on the similar data, to identify at least one additional category of information to be tracked for said plurality of employees, said additional information to be added to the at least one hypercube.

11. The information security computing platform of claim 6 wherein the non-transitory computer-readable medium contains normalization computer-executable instructions stored thereon that, when executed by the at least one processor, cause the information security computing platform to: convert, by the at least one processor, the first user information and the second user information into a template format for storage in the at least one data warehouse.

12. The information security computing platform of claim 6 wherein the non-transitory computer-readable medium contains dark-web computer-executable instructions for searching a dark web, said dark-web computer-executable instructions stored on the non-transitory computer-readable medium that, when executed by the at least one processor, cause the information security computing platform to:
   a. search, via the communication interface, the dark web for dark-web user information regarding the list of targeted of users;
   b. retrieve, via the communication interface, the dark-web user information from the dark web;
   c. store, on the computer-readable medium, the dark-web user information corresponding to the list of targeted users; and
   d. identify, by the at least one processor, the similar data based on the subset of the first user information and the second user information that the targeted users have in common as well as the dark-web user information.

13. The information security computing platform of claim 6 wherein the non-transitory computer-readable medium contains dark-web computer-executable instructions for searching a dark web, said dark-web computer-executable instructions stored on the non-transitory computer-readable medium that, when executed by the at least one processor, cause the information security computing platform to:
    a. search, via the communication interface, the dark web for dark-web user information regarding the list of targeted of users;
    b. retrieve, via the communication interface, the dark-web user information from the dark web; and
    c. store, in the hypercube, the dark-web user information;
wherein the at least one processor identifies the similar data based on the subset of the first user information and the second user information as well as on the dark-web user information.

14. The information security computing platform of claim 7 wherein the non-transitory computer-readable medium contains enhanced-security computer-executable instructions stored thereon that, when executed by the at least one processor, cause the information security computing platform to: implement, by the at least one processor based on the similar data, enhanced security measures for the plurality of users targeted with the common threat vector.

15. The information security computing platform of claim 7 wherein the non-transitory computer-readable medium contains prediction computer-executable instructions stored thereon that, when executed by the at least one processor, cause the information security computing platform to:
    a. predict, by the at least one processor based on the similar data, additional users who may be targeted by the common threat vector;
    b. store, on the non-transitory computer readable medium, a list of the additional users; and
    c. transmit, via the communication interface, from the information security computing platform to the supervisory enterprise user computing device, the list of additional users, wherein transmitting the list of additional users to the supervisory enterprise user computing device causes the supervisory enterprise user computing device to display the list of additional users who may be targeted by the common threat vector allow evaluation of each common threat vector.

16. The information security computing platform of claim 7 wherein the non-transitory computer-readable medium contains machine-learning computer-executable instructions stored thereon that, when executed by the at least one processor, cause the information security computing platform to: machine-learn, by the at least one processor based on the similar data, to identify at least one additional category of information to be tracked for said plurality of employees, said additional information to be added to the at least one hypercube.

17. The information security computing platform of claim 7 wherein the non-transitory computer-readable medium contains normalization computer-executable instructions stored thereon that, when executed by the at least one processor, cause the information security computing platform to: convert, by the at least one processor, the first user information and the second user information into a template format for storage in the at least one data warehouse.

18. The information security computing platform of claim 6 wherein the non-transitory computer-readable medium contains dark-web computer-executable instructions for searching a dark web, said dark-web computer-executable instructions stored on the non-transitory computer-readable medium that, when executed by the at least one processor, cause the information security computing platform to:
    a. search, via the communication interface, the dark web for dark-web user information regarding the list of targeted of users;
    b. retrieve, via the communication interface, the dark-web user information from the dark web; and
    c. store, in the at least one hypercube, the dark-web user information;
wherein the at least one processor identifies the similar data based on the subset of the first user information and the second user information as well as on the dark-web user information.

19. A computer-implemented method for performing connectivity analysis between a plurality of users targeted with a common threat vector comprising the steps of:
    a. storing, by a security computer machine, employee information and social media information in at least one hypercube data warehouse coupled to a network, said security computer machine having:
        i. at least one processor,
        ii. non-volatile memory, and
        iii. a communication interface coupled to the network;
    b. receiving, by the security computer machine from an enterprise computing device via the communication interface, a list of the users targeted with the common threat vector;
    c. storing, by the security computer machine in a first sector of the non-volatile memory, the list of the users targeted with the common threat vector;
    d. analyzing, by the security computer machine, the employee information and the social media information in the at least one hypercube data warehouse to identify similar data corresponding to the list of users targeted with the common threat vector;
    e. storing, by the security computer machine in a second sector of the non-volatile memory, the similar data corresponding to the list of users targeted with the common threat vector; and
    f. transmitting, by the security computer machine to the supervisory enterprise user computing device via the communication interface, the similar data corresponding to the list of users targeted with the common threat vector, wherein transmitting the similar data to the supervisory enterprise user computing device causes the supervisory enterprise user computing device to display a graphical visualization of results of the connectivity analysis based on the similar data in order to identify the common threat vector allow evaluation of each common threat vector.

20. A non-transitory computer-readable medium with computer-executable instructions stored thereon executed by a processor on a security computer machine to perform connectivity analysis between a plurality of users targeted with a common threat vector, said security computer machine coupled to a network, said computer-executable instructions comprising:
    a. first retrieval instructions to retrieve employee information from at least one in-network data store;
    b. first storage instructions to store said employee information in at least one hypercube data warehouse;
    c. second retrieval instructions to retrieve social media information from outside the network;
    d. second storage instructions to store said social media information in the at least one hypercube data warehouse;

e. input instructions to receive a list of users targeted by the common threat vector;
f. search instructions to search the hypercube data warehouse for similar data, in the at least one hypercube data warehouse containing the employee information and the social media information, corresponding to the list of users targeted by the common threat vector; and
g. transmission instructions to transmit, the similar data in the at least one hypercube data warehouse corresponding to the list of users targeted by the common threat vector, to the supervisory enterprise user computing device in order to cause the supervisory enterprise user computing device to display a graphical visualization of results of the connectivity analysis based on the similar data in order to identify the common threat vector allow evaluation of each common threat vector.

* * * * *

UNITED STATES PATENT AND TRADEMARK OFFICE
CERTIFICATE OF CORRECTION

| | | |
|---|---|---|
| PATENT NO. | : 11,381,591 B2 | Page 1 of 1 |
| APPLICATION NO. | : 16/775526 | |
| DATED | : July 5, 2022 | |
| INVENTOR(S) | : Brown et al. | |

It is certified that error appears in the above-identified patent and that said Letters Patent is hereby corrected as shown below:

On the Title Page

Item (72) Inventors, Line 3:
Delete "Matthewa," and insert --Matthews,-- therefor In the Claims Column 17, Claim 4, Line 46:
Delete "computer" and insert --computing-- therefor Column 17, Claim 5, Line 49:
Delete "computer" and insert --computing-- therefor Column 17, Claim 6, Line 65:
Delete "computer" and insert --computing-- therefor Column 18, Claim 7, Line 1:
Delete "computer" and insert --computing-- therefor Signed and Sealed this
Ninth Day of May, 2023

Katherine Kelly Vidal
*Director of the United States Patent and Trademark Office*